US010467488B2

(12) United States Patent
Sicconi et al.

(10) Patent No.: US 10,467,488 B2
(45) Date of Patent: Nov. 5, 2019

(54) METHOD TO ANALYZE ATTENTION MARGIN AND TO PREVENT INATTENTIVE AND UNSAFE DRIVING

(71) Applicants: Roberto Sicconi, Purdys, NY (US); Malgorzata Elzbieta Stys, Purdys, NY (US)

(72) Inventors: Roberto Sicconi, Purdys, NY (US); Malgorzata Elzbieta Stys, Purdys, NY (US)

(73) Assignee: TeleLingo, Purdys, NY (US)

( * ) Notice: Subject to any disclaimer, the term of this patent is extended or adjusted under 35 U.S.C. 154(b) by 0 days.

(21) Appl. No.: 15/820,411

(22) Filed: Nov. 21, 2017

(65) Prior Publication Data
US 2019/0213429 A1   Jul. 11, 2019

Related U.S. Application Data

(60) Provisional application No. 62/424,612, filed on Nov. 21, 2016.

(51) Int. Cl.
*G06K 9/00* (2006.01)
*G06N 5/04* (2006.01)
(Continued)

(52) U.S. Cl.
CPC ......... *G06K 9/00845* (2013.01); *G06F 3/167* (2013.01); *G06K 9/00335* (2013.01);
(Continued)

(58) Field of Classification Search
CPC .......... G06K 9/00845; G06K 9/00335; G06N 20/00; G06N 5/045; G06F 3/167; G06Q 40/08; G08G 1/09626
See application file for complete search history.

(56) References Cited

U.S. PATENT DOCUMENTS 6,236,968 B1 *  5/2001  Kanevsky ............... G10L 17/26
                                                         704/275
8,223,005 B2 *  7/2012  Koenig ................ B60W 50/14
                                                        340/425.5
(Continued)

FOREIGN PATENT DOCUMENTS

CN           106504476 A  *  3/2017

OTHER PUBLICATIONS

Carolyn Said, Nauto dashcams monitor human drivers to help autonomous vehicles, San Francisco Chronicle, Nov. 21, 2016 http://www.sfchronicle.com/business/article/Nauto-dashcams-monitor-human-drivers-to-help-10628742.php.
(Continued)

*Primary Examiner* — Brenda C Bernardi
(74) *Attorney, Agent, or Firm* — Caldwell Intellectual Property Law

(57) ABSTRACT

A method includes a computing device a computer device receiving extracted features from a driver-facing camera and from a road as viewed by a road-facing camera; the computer device further receiving extracted features reflecting the driver's behavior including head and eyes movement, speech and gestures; the computer device further receiving extracted telemetry features from a vehicle; the computer device still further receiving extracted features reflecting the driver's biometrics; and a decision engine receiving information from the computer device representing each of the extracted features of the driver, wherein a driver's attention and emotional state is determined to evaluate risks associated to moving vehicles and the driver's ability to deal with any projected risks.

20 Claims, 11 Drawing Sheets

(51) Int. Cl.
  *G06N 20/00* (2019.01)
  *G06Q 40/08* (2012.01)
  *G06F 3/16* (2006.01)
  *G08G 1/0962* (2006.01)

(52) U.S. Cl.
  CPC ............ *G06N 5/045* (2013.01); *G06N 20/00* (2019.01); *G06Q 40/08* (2013.01); *G08G 1/09626* (2013.01)

(56) References Cited

U.S. PATENT DOCUMENTS

| | | | |
|---|---|---|---|
| 9,135,803 B1* | 9/2015 | Fields | B60K 28/066 |
| 2003/0095046 A1 | 5/2003 | Borugian | |
| 2012/0271484 A1* | 10/2012 | Feit | B60W 10/18 701/1 |
| 2013/0070043 A1* | 3/2013 | Geva | B60K 28/066 348/14.02 |
| 2014/0046701 A1* | 2/2014 | Steinberg | G06Q 40/08 705/4 |
| 2014/0139655 A1* | 5/2014 | Mimar | G08B 21/06 348/77 |
| 2016/0001781 A1 | 1/2016 | Fung | |
| 2017/0080856 A1* | 3/2017 | Enomoto | B60C 9/00 |
| 2017/0110022 A1 | 4/2017 | Gulash | |
| 2017/0341658 A1* | 11/2017 | Fung | B60W 40/08 |
| 2017/0355377 A1* | 12/2017 | Vijaya Kumar | B60W 40/08 |
| 2018/0086264 A1* | 3/2018 | Pedersen | G08G 1/0116 |
| 2018/0113454 A1* | 4/2018 | Emura | B60W 30/182 |

OTHER PUBLICATIONS

Gregory Rice, • CarVi Provides Real-time Driving Assistance , Newegg Official Blog ,Dec. 16, 2016 , https://blog.newegg.com/carvi-real-time-smart-driver-safety-aide/.

Sarah Buhr, • The Caruma Aims to Be a Fitbit for Cars, TC, Dec. 7, 2015 , https://techcrunch.com/2015/12/07/the-caruma-aims-to-be-a-fitbit-for-cars/.

Caruma Technologies, • Caruma Technologies and Accuscore Collaborate on AI-Powered, Vision-Augmented Driver Scoring Capabilities to Improve Drivers' Performance and Make Driving Safer , Cision PR Newswire Jun. 21, 2017 https://www.prnewswire.com/news-releases/caruma-technologies-and-accuscore-collaborate-on-ai-powered-vision-augmented-driver-scoring-capabilities-to-improve-drivers-performance-and-make-driving-safer-300477311.html.

Manju Mathew, • Denso to Work with FoloNation on Advanced Image Recognition Technology to Keep Tabs on Driver Alertness Tires and Parts Oct. 19, 2017 https://tiresandparts.net/news/parts/denso-work-fotonation-advanced-image-recognition-technology-keep-tabs-driver-alertness/.

Brittni Rubin, • Vehicle Surveillance Camera Provider Helps Customers See Benefits LCT Aug. 9, 2012 https://www.lctmag.com/article/41565/vehicle-surveillance-camera-provider-helps-customers-see-benefits.

\* cited by examiner

201

METHOD TO ANALYZE ATTENTION MARGIN AND TO PREVENT INATTENTIVE AND UNSAFE DRIVING

RELATED APPLICATION

This application claims priority to provisional application No. 62/424,612, entitled "METHOD TO ANALYZE ATTENTION MARGIN AND TO PREVENT INATTENTIVE AND UNSAFE DRIVING" filed Nov. 21, 2016.

BACKGROUND

Current solutions monitor driving behavior by evaluating vehicle dynamics. Driving risk is correlated with speed, braking, cornering, without taking into account traffic, weather conditions, attention paid by the driver to events happening on the road, ability to control the vehicle in unexpected situations, proper physical and mental conditions.

Car accidents in the US (400 k+ in 2015) are on the rise (+9%), after a decade of slow but steady declines. Although safer cars and improved driving assist equipment help prevent accidents, distracted driving is more than offsetting all these benefits. State bans on the use of cell phones in cars seem not to work. Mobile apps that intercept distracting calls or the use of apps are easy to circumvent and distractions can also come from sources other than phones.

The old fashioned way to solve the problem is to rely on the collaboration of a front seat passenger who 1) is aware of sudden driving risks, 2) can tell whether the driver is paying sufficient attention to driving, and 3) will warn the driver when needed. But a front seat passenger is not always there to help out.

Over the recent years, basic telematics services have been introduced to encourage safe driving via Usage Based Insurance (UBI) plans.

The present invention represents an evolution of UBI telematics systems by combining analytics of telematics data, driver observed behavior and performance, to compute driving risk scores. Most importantly, the invention provides real time and personalized feedback to the driver to prevent dangerous situations caused by distraction in the first place.

The present invention relates to a method to evaluate
a) attentiveness of people while performing a task or communicating with another party (person or machine
b) estimated level of risk associated with the surrounding environment
c) the margin between the level of available attention and the attention level required by the task or communication
in order to provide
d) useful feedback to the person being observed on their behavior
e) suggestions on how to change behavior in order to reduce or minimize the risk.
Artificial Intelligence (AI) is used to convert observed patterns into behavior profiles, to refine them over multiple observations and to create group statistics across similar situations.

As an example, one important application includes driving risk profiling and prevention of accidents caused by distracted and drowsy driving, using machine vision and AI to create the ultimate Digital Assistant with Copilot Expertise. All drivers can benefit, particularly teenage drivers, elderly drivers or drivers with chronic conditions.

Fleet management companies, car insurance companies, ride sharing and rental car companies as well as healthcare providers can take advantage of this invention to improve, fine tune, personalize their services and make them more cost competitive.

The present invention provides a platform for Driver Attention Management (Smart Driver Monitoring) to address escalating problems of unsafe driving. It covers end to end the attention spectrum, ranging from distracted driving to experiencing drowsiness on long, boring stretches of road.

Mobile devices and their apps are not designed to be distraction-free. They ignore the stress level that the driver may be under, possibly requiring full attention at a split second notice. At the same time, drivers who benefit from reduced cognitive load ensured by sophisticated driver assist are more easily subject to drowsiness, another leading cause of fatal accidents.

The vast majority of driving assist solutions ignore drivers' fatigue, stress, wellness, fitness, reaction capabilities to anticipate risks and adjust warning margins.

With current logging driver information, known monitoring solutions do not support secure data access rights with high degrees of configuration flexibility provide real time feedback mechanisms, provide ability to suspend/revoke select access rights at any time, including while driving. With the present invention Electronic Driving Record (EDR) the driver can reinstate access rights dynamically while driving or at the end of a trip, let the driver identify who gets to see what EDR data, when and how create accurate driving behavior models support inclusion of sensors data (e.g. health-related) measure and log attention level of the driver. Current systems further fail to address the privacy implications with UBI data gathering.

SUMMARY

According to one aspect of the present invention, a method includes a computing device a computer device receiving extracted features from a driver-facing camera and from a road as viewed by a road-facing camera; the computer device further receiving extracted features reflecting the driver's behavior including head and eyes movement, speech and gestures; the computer device further receiving extracted telemetry features from a vehicle; the computer device still further receiving extracted features reflecting the driver's biometrics; and a decision engine receiving information from the computer device representing each of the extracted features of the driver, wherein a driver's attention and emotional state is determined to evaluate risks associated to moving vehicles and the driver's ability to deal with any projected risks.

According to another aspect of the present invention, a driver assistant system includes: one or more processors, one or more computer-readable memories and one or more computer-readable, tangible storage devices; a driver's attention state module operatively coupled to at least one of the one or more storage devices for execution by at least one of the one or more processors via at least one of the one or more memories, configured to receive extracted features for a driver from a camera facing the driver and from a road as viewed by a camera facing the road; the driver's attention module operatively coupled to at least one of the one or more storage devices for execution by at least one of the one or more processors via at least one of the one or more memories, is further configured to receive extracted features reflecting the driver's facial and hand gestures, and speech; the driver's attention module operatively coupled to at least one of the one or more storage devices for execution by at least one of the one or more processors via at least one of the one or more memories, is further configured to receive extracted features reflecting the driver's biometrics; and a decision engine module operatively coupled to at least one of the one or more storage devices for execution by at least one of the one or more processors via at least one of the one or more memories, configured to receive information from the driver's attention module representing each of the extracted features of the driver, wherein a driver's attention, wellness and emotional state is determined.

According to yet another aspect of the present invention, a virtual co-pilot method includes: an image processor receiving images from a camera facing a driver; the image processor receiving scans from an infrared scanner facing the driver; road facing camera a speech engine receiving speech from the driver using a microphone; and biosensors providing biometric data from the driver to a processing unit, wherein the processing unit uses machine learning to dynamically evaluate risks associated by the received images and scans from the image processor, the received speech from the speech engine and the provided biometric data from the biosensors to determine a driver's attention, emotional state and fatigue.

BRIEF DESCRIPTION OF THE OF THE DRAWINGS

DETAILED DESCRIPTION

Figure 1:
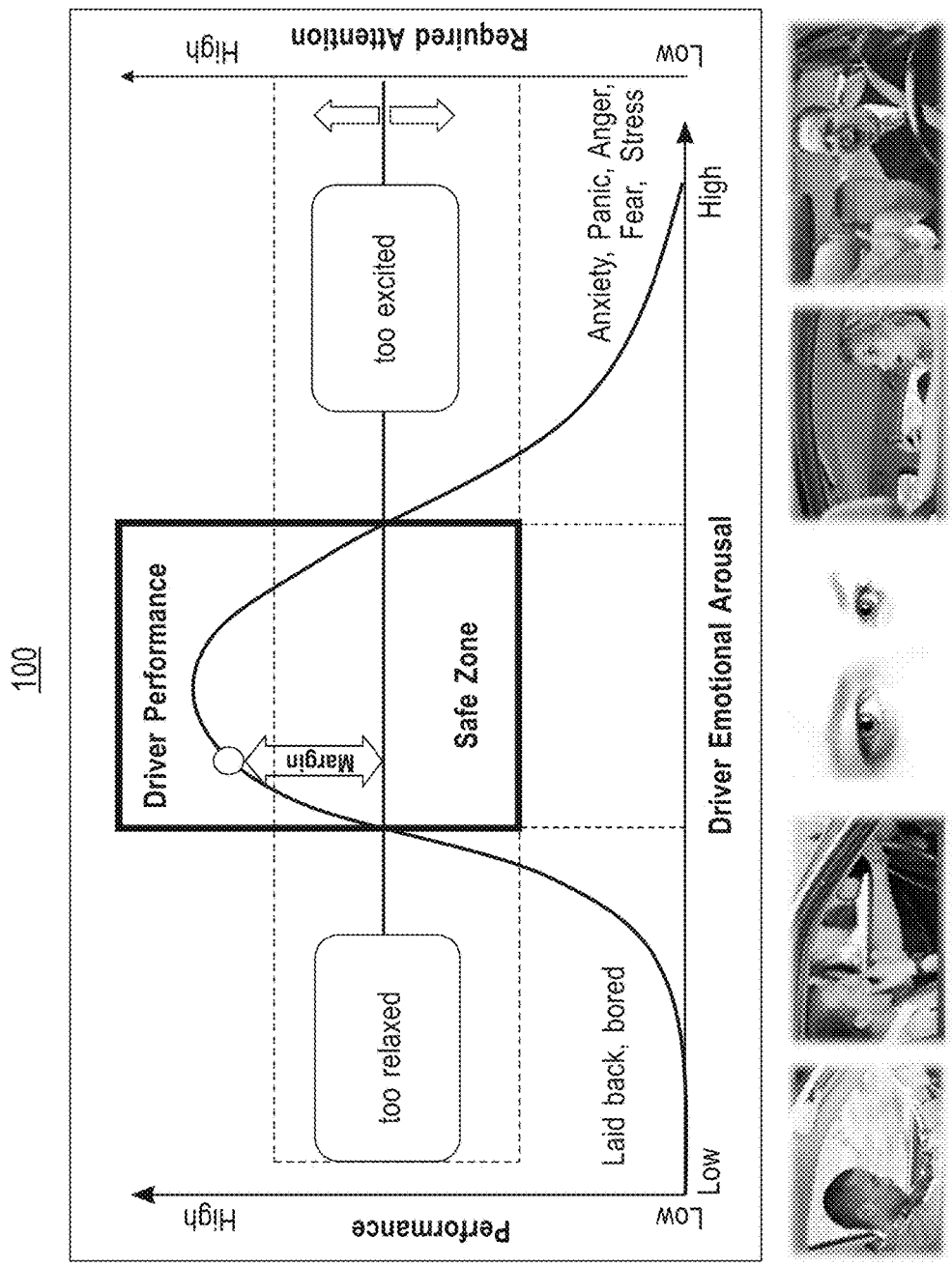
FIG. 1 shows a chart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

The present invention is the first intelligent attention monitoring system, aware of driver's physical health condition, driving skills, driving habits and surrounding context, that has the ability to evaluate responsiveness of a driver to guidance, performance in executing interventions and that can modify communication strategy based on observed effectiveness, without the need for expert human intervention. The invention will enable safer driving by providing real time feedback to the driver about potentially hazardous conditions to prevent accidents caused by inattentiveness or impaired health conditions.

Holistic nature of data analysis in real time (driver face and eyes, health condition, telemetry, outside contextual data) makes this solution very unique. Modeling the highly dynamic and multiple dimensions context, and providing accurate feedback in real time on recommended actions requires expertise in several areas. It also requires extensive data collection and ingenuity to create sophisticated algorithms to create and use personalized models to benefit the driver by keeping him/her safe. Biosensors are part of the holistic data analysis. In addition to visual inputs from camera and telemetry data, Heart Rate Variability (HRV) and Galvanic Skin Response (GSR) provide reliable information to determine driver stress and fatigue measured in multi-dimensional context.

The invention's unique approach provides an accurate evaluation of the driver's attention level compared to driving needs, the ability to recognize unusual driving behaviors, to adapt to driving style and skill, all with the convenience of an affordable mobile app.

The present invention saves lives of drivers by observing and modeling their attention to prevent accidents caused by distraction and drowsiness. It assists insurance companies in fairer distribution of insurance premiums by building driver profiles. It assists ride sharing and rental companies with in cabin and on the road safety monitoring device by monitoring and modeling driver and passenger behavior. It helps fleet management companies efficiently manage their truck fleets by monitoring and modeling driver behavior and real time feedback. It helps parents of teenage drivers keep them safe and reduce their car insurance costs by monitoring their driving and application of virtual coaching. It helps keep driver and passenger data secure and up to the individual user to give permissions of use by controlling generation, maintenance and distribution of EDR per data owner's preferences and insurer's incentives. It helps with health monitoring of drivers to ensure their safety in the cabin and catch any emergency situations ahead of time. Finally, it helps with transition to self-driving vehicles to assist in smooth transfer of driving control from vehicle to driver and vice versa.

In short, the benefits of the present invention focus on saving lives. It makes driving safer, less expensive, and insurance rates fairer. It introduces driving style and performance scoring. It ensures a safe driving experience and liability protection. It provides brand risk management and risk mitigation and ensures safety. It keeps teenage and beginner drivers alert. It improves driving skills with Virtual Coach. It keeps driver and passenger data secure with opt-in technology whereby maintenance and distribution of EDR happens per data owner's preferences and insurer's incentives. It monitors health conditions of drivers to detect emergencies, especially for the elderly and people with chronic health problems. It makes car-driver hand over in self driving vehicles tight and safe.

Figure 2:
FIG. 2 shows an exemplary implementation according to an embodiment of the present invention.
Figure 2:
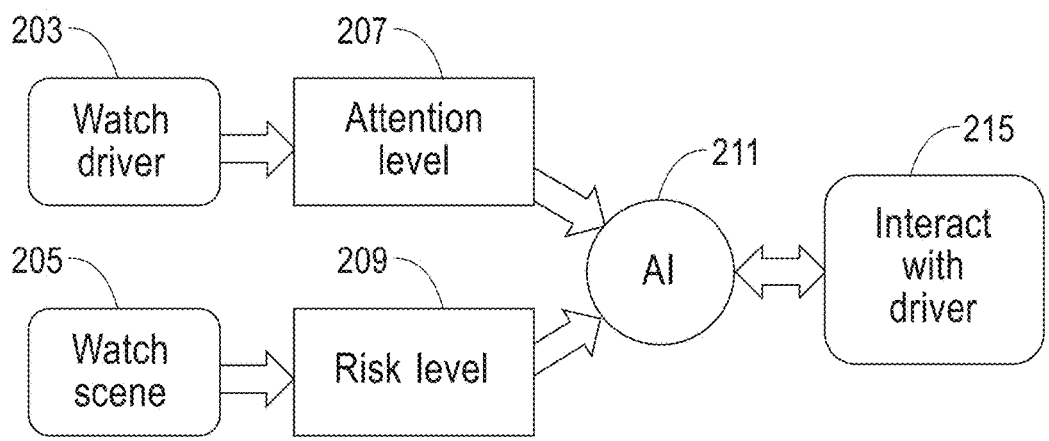

The invention is an intelligent driver attention monitoring system. It mimics the behavior of a dependable passenger who can evaluate the driving context risk (associated to the current speed, acceleration, breaking, cornering, pavement, weather and traffic conditions), then match it against the level of attention exhibited by the driver. If the driver looks away from the road for too long or too often, or the car is zigzagging in the lane, the virtual passenger warns the driver with specific signals or with spoken utterances (FIG. 2).

The invention provides effective and accurate evaluation of driving risk by evaluating driver's performance and attention against road and traffic conditions. The invention generates advance warnings to the driver & feedback to the car insurance. It also evaluates the response of the driver.

The system uses machine vision to analyze head pose, eye gaze and eye lid closing patterns to flag possible distraction and unsafe conditions. Deep Learning is used to create personalized models of driving habits and experience.

In order to make sure that warnings are only given when necessary, AI is used to manage interaction with the driver and to power the ultimate Digital Assistant with Copilot Expertise.

Following National Highway Traffic Safety Administration (NHTSA)'s recommendation for distraction free interactions, the invention offers hands-free, eyes-free, vehicle- and context-aware operations.

In the case of the ride sharing industry, in addition to monitoring risk on the road and driver attention level, the invention offers the ability to monitor in-cabin behavior and flag potentially dangerous situations, enabling the following value propositions.

By reducing the risk of accidents, the invention protects and induces good behavior of drivers and passengers.

The core idea relating to driver data management is generation, maintenance and distribution of EDR per data owner's preferences and insurer's incentives. Driving data from EDR Bank is distributed to parties who own the data and can benefit from granting access rights to car insurance companies. Those EDR access conditions (what type of data, when, to whom, and under what conditions) is a key component of this invention.

While driving, two categories of data are being collected 1) data external to the car, 2) data collected from the car, including driver's behavior. Driving data includes a multitude of parameters such as driver id, location, speed, acceleration, braking, cornering, throttle aperture, steering wheel motion, time of day, weather conditions, traffic information, proximity to surrounding cars (ahead, behind, on the side), positioning in lane, driver face/eye gaze direction, eyelids closing patterns, hands position and gestures, spoken utterances and their transcription, acoustic noises in the cabin, video recording of key events (e.g. crashes).

All driving data is stored in an Electronic Driving Record (EDR), in the form of live and historic data, later to be processed, analyzed and distributed accordingly. The invention also relates to data protection, privacy and security. It addresses the ultimate question of who gets access to what EDR information, when, at what time and under what conditions, as defined and legally released by the driver. EDR data is stored on secure cloud storage and data access is managed as part of the service, to drivers and other users authorized by the driver (e.g. Insurance Carriers, Healthcare providers, Car Manufacturers). EDR data generated by the invention is owned by the driver or the owners of a fleet, who has overriding authority to decide who else gets access to it.

Advantages of the invention are as follows:
Access to information is dependent on real time authorization by the owner. Access rights can be revoked at any time per driver's needs and preferences;
Changes in access rights trigger respective alterations in insurance benefits. Data access authorization can take place once or the driver can authorize on continuous basis until authorization is rebuked.
Biosensors (e.g. Heartbeat Rate, Blood Pressure, Galvanic Skin Response, Breathing) can be used to improve the invention accuracy in evaluating body and mind fitness conditions such as fatigue, stress, drowsiness, and distraction.

Now referring to FIG. 1, an embodiment of the present invention, shows that driving performance peaks at "normal" conditions. Fatigue and drowsiness lead to reduced performance and ability to respond to challenging situations. Excessive excitement, anxiety, anger, stress, fear, nervousness lead to reduced ability to perform correct driving actions. The "driving risk" level (red line) moves up and down, sometimes very quickly, altering the attention "margin" of the driver. The invention's objective is to constantly estimate the margin and provide pointed feedback to the driver to allow him/her to adjust behavior and prevent dangerous situations.

Still referring to FIG. 1, 100 describes in part the Yerkes-Dodson law, used by psychologists to relate performance to arousal. Humans drive best when they are in the "Safe Zone", away from drowsiness and excessive excitements, and from distractions.

Referring to FIG. 2, an exemplary implementation according to an embodiment of the present invention is depicted. The invention is aware of the context, traffic situation, relative position of other vehicles, driving conditions and it observes driver's actions to detect possible dangerous situations. Like a human copilot would do, it alerts the driver when he/she appears to be distracted or drowsy and if necessary, it would attempt to engage verbally with the driver to restore proper attention level. Driving condition may be a combination of parameters that influence driving risk, such as speed, acceleration, braking, cornering, traffic density, weather, light conditions, distance from other vehicles, roughness of the pavement, presence of nearby obstacles.

The invention acts like a smart copilot 201, who watches the scene 205 and assesses the risk level 209 on the road ahead. The copilot 201 also watches the driver 203, knows how to "read" the driver's attention level 207. The copilot 201 knows about driver's skills and can speak up and interact with driver 215. If or when the Artificial intelligence (AI) detects 211 danger not being appropriately handled by the driver, the machine learning and AI 211 are used to adapt monitoring and reasoning to drivers' habits and preferences and to make the communications with the driver 215 as nonintrusive and effective as possible.

Figure 3:
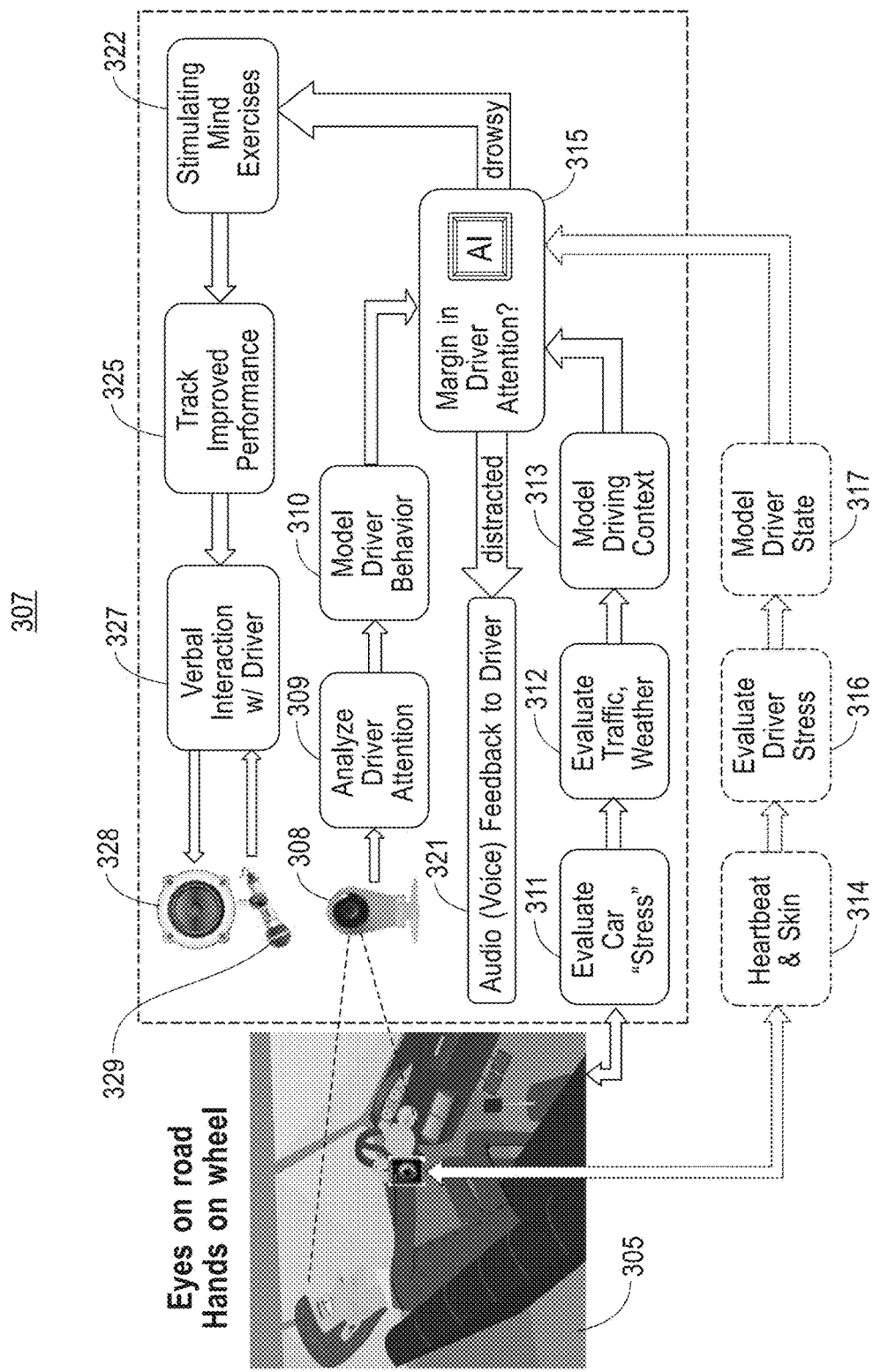
FIG. 3 shows another exemplary implementation according to an embodiment of the present invention.

FIG. 3 shows how the invention uses extended Telemetry data, traffic, weather, road conditions, route changes ahead, day/night illumination, noise information, vehicles/objects ahead to estimate driving risk level at any given time. It also monitors where the driver is looking, for how long, whether there are symptoms of drowsiness, how the driver is responding to stimuli, to estimate driver attention. An AI module, personalized to accommodate for driver's driving style and behavior, decides when the attention level is insufficient. In this case, it intervenes by providing immediate feedback. When a pattern of drowsiness symptoms is detected, the invention offers the driver to engage in cadenced question-answer mini-dialogs, to awake the driver and help restore proper attention.

Still referring to FIG. 3 monitors a driver 305 and the driver's behavior 307. The invention observes the face and eyes orientation using a camera 308 pointed at the driver. Direction of driver's attention is classified by rotation angles (yaw, pitch, roll and eyes lateral movements) to analyze the driver's attention 309 (road ahead, left mirror, right mirror, central rearview mirror, instrument cluster, center dash, passenger seat, phone in hand, etc.) and model driver behavior 310. Car dynamics data is evaluated 311 (acceleration, speed, RPM, engine load, . . . ) are collected from sensors (embedded in unit or in associated phone, road-facing camera with object detection and distance evaluation capabilities) and optionally from vehicle buses (OBDII, CAN), complemented with dynamic trip information 312 (e.g. traffic, weather from associated phone) to evaluate driving risk at any given time using a model driving context 313. An AI powered decision engine 315 determines the type of driver of inattention: if distracted, it alerts the driver with sounds or voice prompts 321 selected and paced based on the level of urgency. If drowsy, the system warns the driver using verbal interaction 327 and proposes attention-engaging brief dialogs stimulating mind exercises 322. Responsiveness of the user is tracked 325 to determine length and richness of the dialog with the driver 327. A microphone (optionally array of microphones) 329 and a speaker 328 (optionally a wireless speakerphone) are used to verbally communicate with the driver. If biosensors 314 to monitors heart rate and galvanic skin response are installed in the vehicle or worn by the driver, data is wirelessly transferred to a stress/fatigue monitoring device 316 or algorithm in the system, to provide additional physical model driver state information 317 which is transferred to the Decision Engine 315.

Figure 4:
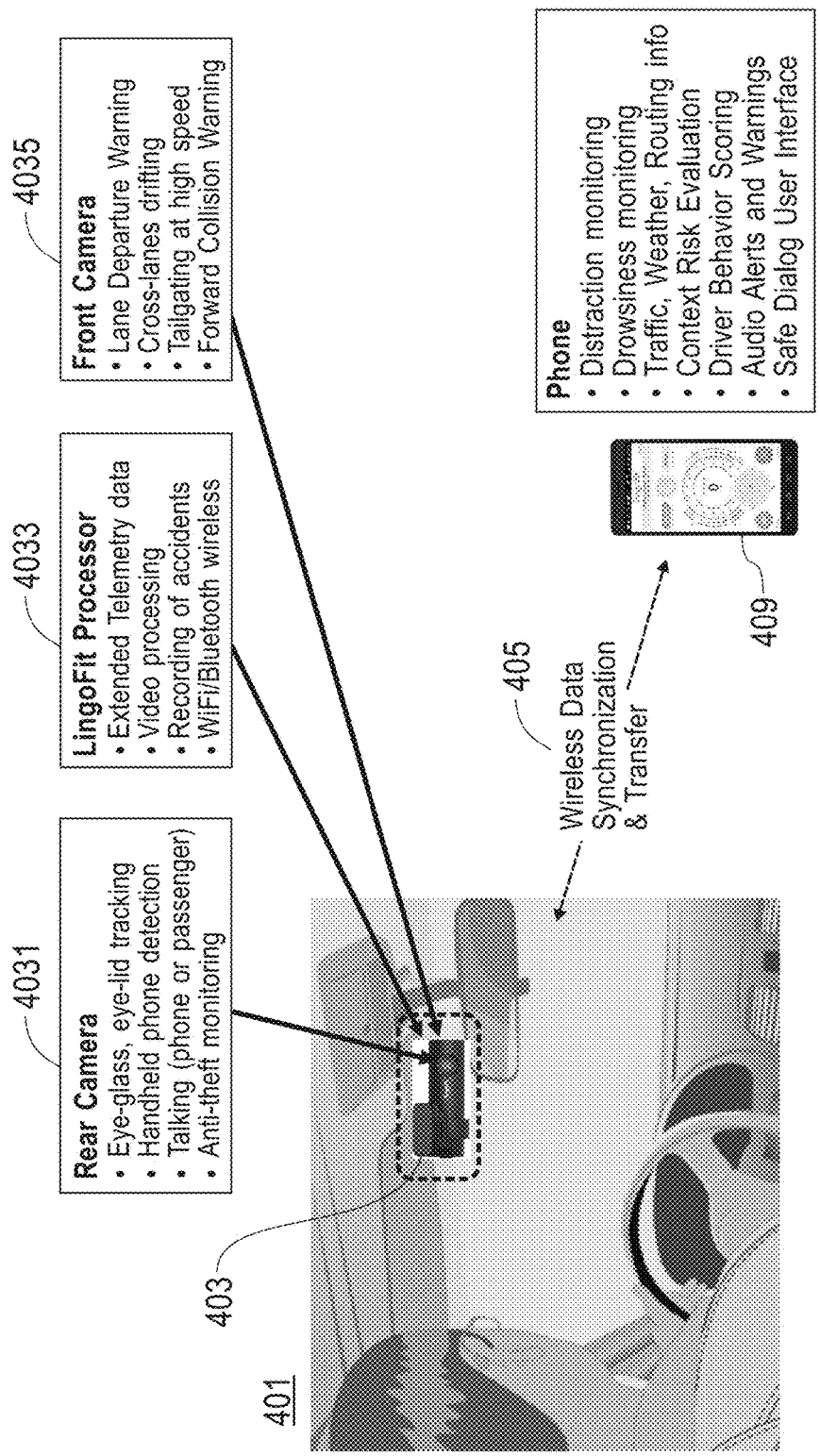
FIG. 4 shows still another exemplary implementation according to an embodiment of the present invention.

Referring to FIG. 4 shown is driver facing smart camera unit mounted close to the rearview mirror. The forward facing smart camera is attached to the windshield, next to the rearview mirror's mount. Wireless connectivity provide data transfer between the cameras and the smartphone. More specifically, the smart monitoring solution 401 consists of a unit 403 mounted next to the rearview mirror (attached to windshield or to body of rearview mirror) to provide best view of a driver's face while minimizing interference with road view. The unit 403 contains a road-facing camera 4035, a driver-facing camera 4031 and a processing unit 4033 to analyze and process video streams from the two cameras, and to communicate 405 (wirelessly or via USB connection) with a mobile application on a phone 409.

Figure 5:
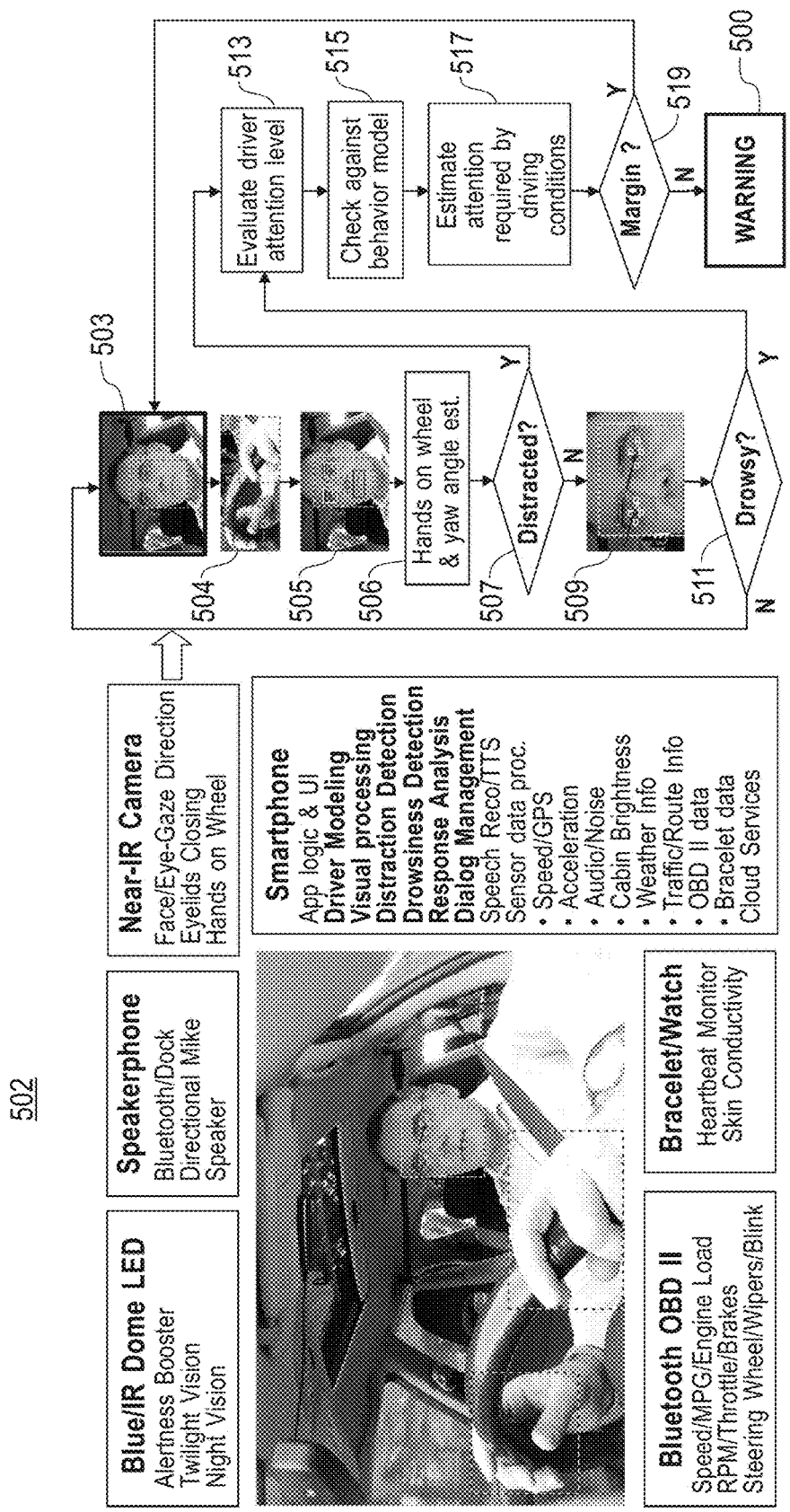
FIG. 5 shows still another exemplary implementation according to an embodiment of the present invention.

FIG. 5 shows how the driver facing camera extracts face contours, identifying eyes, nose, mouth to evaluate yaw, pitch, roll of the face, eye gaze direction and eye lid closing patterns. A Neural Network is used to analyze the parameters and determine distraction and drowsiness conditions. The attention monitoring system 502 detects the face 503 and the hands 504 of the driver. Then it identifies facial landmarks and special regions 505 like eyes, nose, mouth to estimate head pose and eye gaze direction 506, together with information about hands holding the steering wheel. If head and/or eyes are directed away from the road signaling distraction 507. The system monitors the attention level of the driver 513 against a personalized behavior model 515 and permissible thresholds (duration, frequency, patterns) compatible 517 with driving risk computed from the driving context. If the safety margin is inadequate 519 warning alerts 500 are sent to the driver immediately. If the driver is not found to be distracted but shows signs of drowsiness 509, the system starts evaluation of driver attention 513 against user behavioral models 515 and safety margins following the same flow used for distracted driving monitoring. When the driver is not found to be distracted 507 nor drowsy 511 the system returns to observing the driver's face 503 and hands 504.

Figure 6:
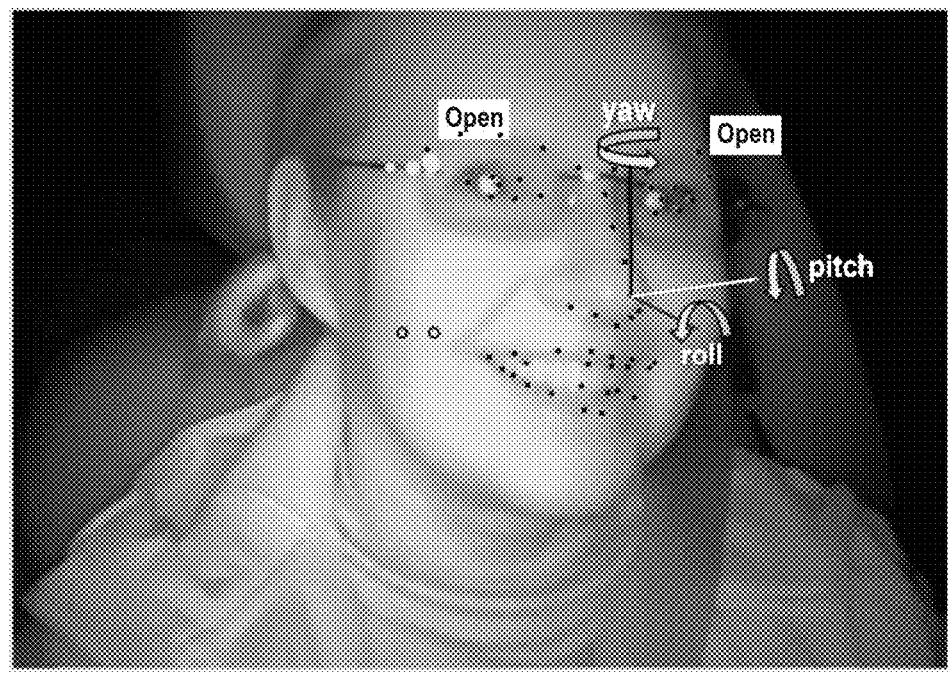
FIG. 6 shows the use of parameters as used by exemplary implementation according to an embodiment of the present invention.

FIG. 6 shows yaw, pitch and roll used to measure rotation of driver's face in space. The image 602 shows the three parameters used to classify orientation of a driver's face: Yaw is the horizontal movement (left to right), Pitch is the vertical movement (up to down), Roll is the side tilting of the head, leaning left or right. Yaw and Pitch are the two key parameters to identify distraction.

Figure 7:
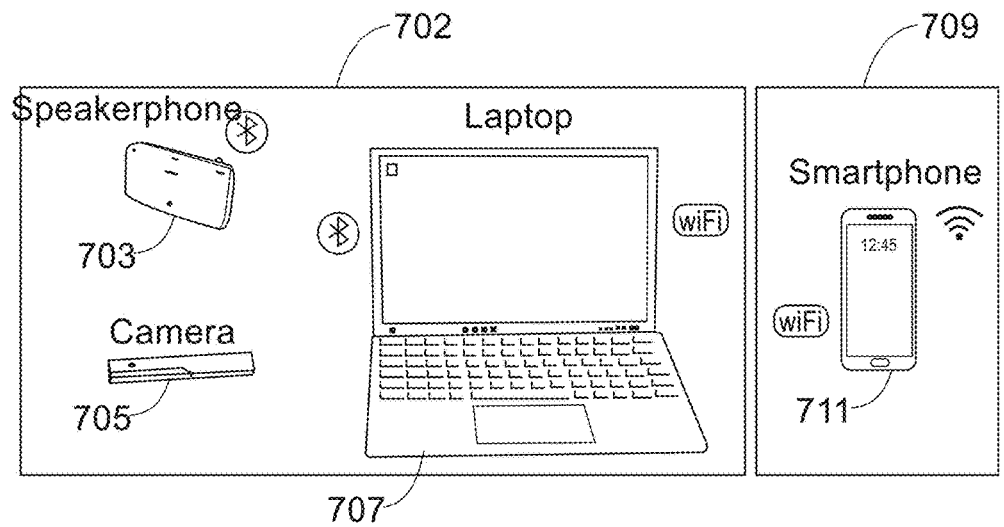
FIG. 7 shows still another exemplary implementation according to an embodiment of the present invention.

FIG. 7 shows system 702 using a USB connected camera 705 containing RGB (Red, Green, Blue a.k.a. visible) and NIR (Nearinfrared) sensors, coupled with an InfraRed LED scanner, to extract face and eyes features. A Bluetooth connected speakerphone 703 is used to position microphone and speaker on a visor, close to the driver. A laptop 707 provides computation to run context analysis, combine it with the features extracted by the smart camera to decide about driver's attention margin and provide audio feedback when necessary. An optional WiFi-connected smartphone 711 provides telemetry data, map/routing info, cloud services (weather, traffic), audio/video recording capabilities and speech recognition and synthesis for dialog interaction with the driver. The smartphone 711 further collects sensor information (3D accelerometer, 3D gyroscope, GPS location and timestamps) and transfers processed information to the cloud 709.

Figure 8:
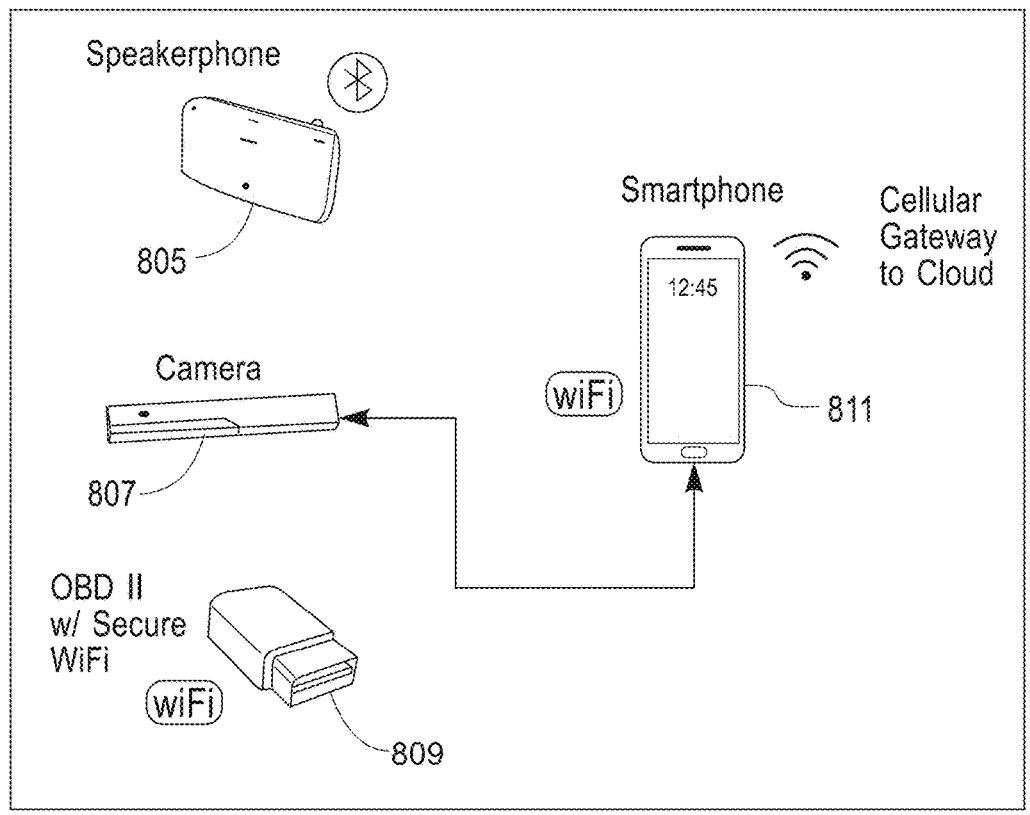
FIG. 8 shows still another exemplary implementation according to an embodiment of the present invention.

FIG. 8 shows another system according to another embodiment of the invention using a smart camera containing RGB and NIR sensors, coupled with an InfraRed LED scanner, to extract face and eyes features connected to a smartphone. A Bluetooth connected speakerphone is used to position microphone and speaker on a visor, close to the driver. The smartphone computation to run context analysis, combine it with the features extracted by the smart camera to decide about driver's attention margin and provide audio feedback when necessary. It provides also Telemetry data, map/routing info, cloud services (weather, traffic), audio/video recording capabilities as well as speech recognition and synthesis for dialog interaction with the driver.

Still referring to FIG. 8, the system 803 bypasses the use of a laptop to run all processing on a smartphone 811 which is connected via a USB OTG to a visible+NIR camera 807. An optional on board diagnostics unit (OBD II) and cellular-connected WiFi hotspot (809) provides information about additional car data available from the vehicle bus (OBD II/CAN) and an alternate way to transfer processed data to the cloud. An optional Bluetooth speakerphone 805 improves quality and loudness of system-generated alerts and a better positioned microphone, to improve speech recognition accuracy.

Figure 9:
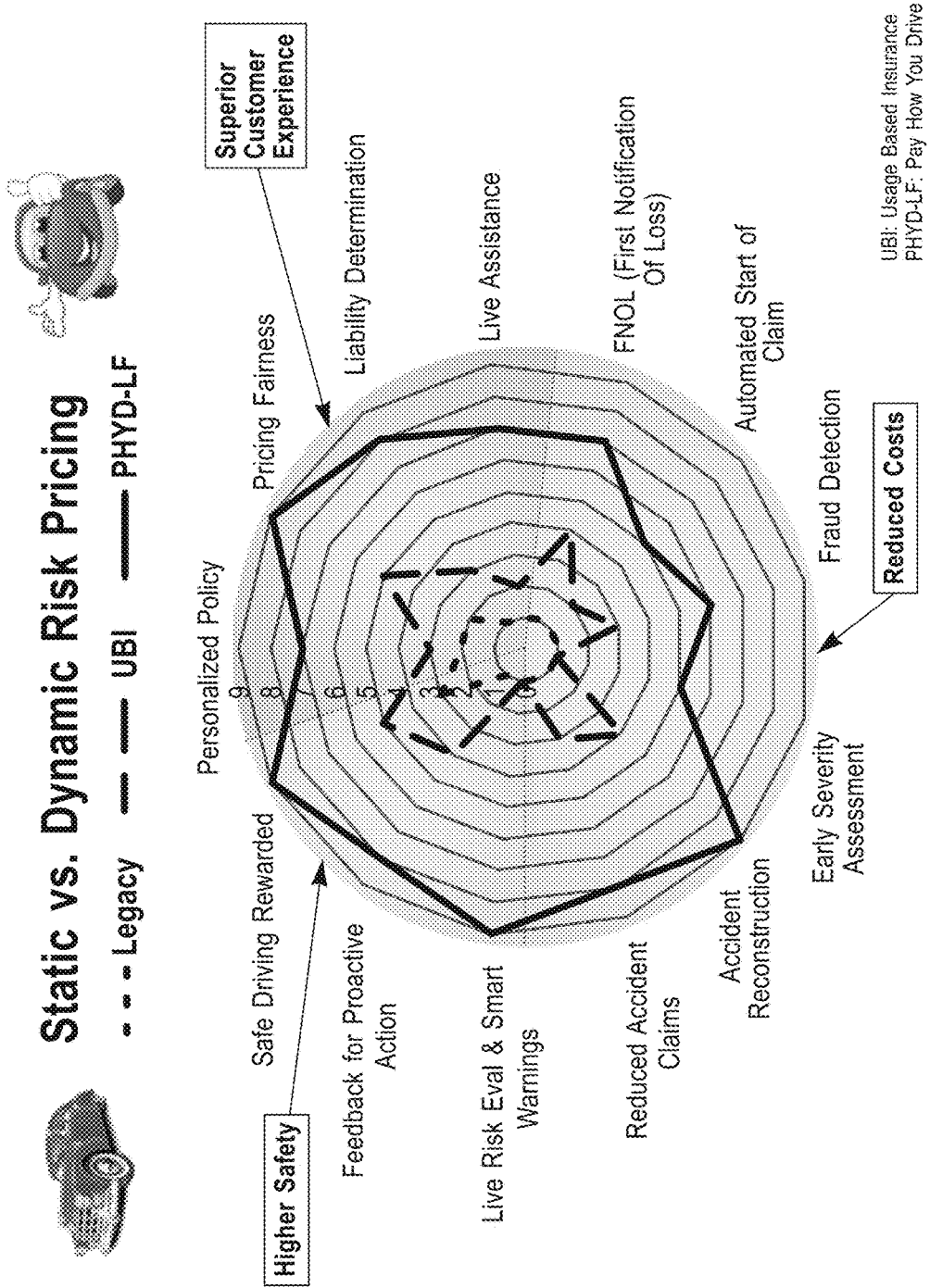
FIG. 9 shows a chart highlighting risk pricing according to an embodiment of the present invention.

FIG. 9 shows how the invention clearly exceeds capabilities of all existing solutions for Usage Based Insurance, by providing richer and more accurate services.

Figure 10:
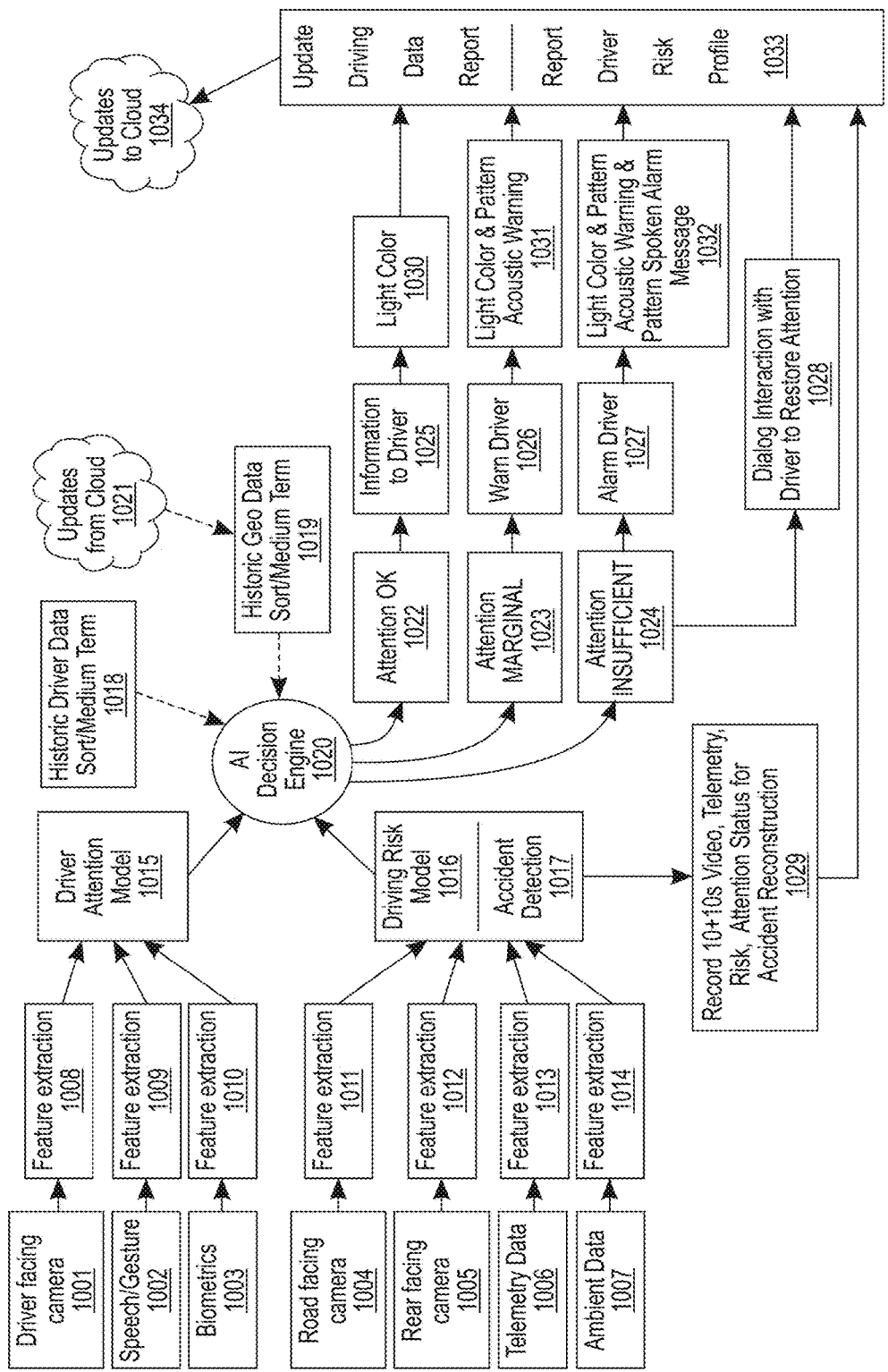
FIG. 10 shows still another exemplary implementation according to an embodiment of the present invention.

FIG. 10 shows one possible architecture for the invention. It includes:
Visible and NIR Camera pointed to driver face/eyes to analyze head pose; eye gaze tracking and record driver's face and back passenger seat in case of accident;
Speech and Gesture Interface for driver to provide or request information via microphone, face or hand gestures;
Biometric and Vital Signs (HRV, GSR) data provided via wearable bracelet, sensors on steering wheel or driver seat, wireless evaluation of Heart Beat and Breathing patterns;

Forward-facing Camera to detect lane lines, distance from vehicles in front, scene analysis and recording;
Rear Camera to view, analyze, record (in case of accident) back of car;
3D Accelerometer, Gyroscope, Compass, GPS (time, location, speed), plus VIN, Odometer, RPM, Engine Load via OBD II connection;
Traffic, weather, day/night illumination, road conditions, in-cabin noise or voices;
Feature extraction from visual clues (attention, distraction, drowsiness, drunkenness, face identification, problematic interactions between driver and passenger(s);
Feature extraction of spoken words (Speech Reco, Natural Language Processing (NLP)), detection of altered voice, detection of hand gestures;
Feature extraction of fatigue, stress, reaction to fear/surprise, from biosensors;
Feature extraction of objects (vehicles, walls, poles, signs, pedestrians, . . . ) as well as relative distance and movements, position of car with respect to lane markings, detection of road signs;
Feature extraction of vehicle position and speed behind car;
Feature extraction of driving smoothness/aggressiveness;
Feature extraction of ambient "harshness" and impact on driving stress;
Machine Learning engine to continuously evaluate driver attention level;
Machine Learning engine to continuously evaluate driving risk;
Module to detect car crash conditions;
Features extracted from past behaviors/driving skills of the driver;
Features extracted from past or dynamically reported critical information about traffic jams, dangerous intersections, ice patches, car accidents;
Intelligent decision engine to compare estimated attention level exhibited by the driver, vs. attention level required to handle the estimated risk condition;
Decisions are based also on past performance of the driver, and adjusted for perceived changes of the day (nervousness, anger, fatigue)
Real time ambient data updates from Cloud Services (via phone connection);
Determination that driver attention level is adequate or better, for the driving task;
Determination that the driver attention level is marginal;
Determination that the driver attention level is insufficient to handle the driving task;
Minimal status update to driver;
Proactive information to driver that attention is borderline;
Proactive information to driver that attention is insufficient and action has to be taken;
Information to driver about reasons for the insufficient attention and requests to correct behavior;
Recording of 10 sec before crash and 10 sec after crash of all video feeds, audio, all telemetry and ambient information;
Attention ok: steady green feedback light;
Attention marginal: slowly blinking yellow feedback light plus acoustic warnings;
Attention insufficient: fast blinking red feedback light, acoustic warnings and spoken directions for correction;
Periodic update of driving stats in driving record, computation of driver risk profile;
Periodic update of all critical information to cloud, for by/trip, by/area, by/population statistical analysis;

More specifically, the architecture system of FIG. 10 includes: a driver attention modeling unit 1015 that analyzes features 1008 (e.g. closed eyes, yawning, eyes pointed away from road) extracted from video feed from a driver facing camera 1001, features 1009 (e.g. verbal reaction/responses to system prompts, hands off the steering wheel) extracted from speech and gestures 1002 of the driver, features 1010 extracted from biometrics sensors 1003, wearable of built-into the vehicle (e.g. fatigue, stress, reaction to scare). A driving risk model 1016 and accident detection/prevention unit 1017 analyzes features 1011 (e.g. vehicles ahead, pedestrian crossing the road, cyclists, animals, trees, road sign posts) from a road-facing camera 1004, features 1012 from a rear-facing camera 1005 such as tailgating vehicles coming too close, features 1013 from telematics data 1006 such as speed, acceleration, braking, cornering, engine load, fuel consumption, features 1014 from ambient data (2007) such as weather/traffic information.

A Decision Engine 1020 evaluates attention 1015 vs. risk 1016 and historic short- and long-term data 1018 about driver's performance in past similar situations to decide the type of feedback to provide to the driver. Historic geo data 1019 is updated from the Cloud 1021 when vehicle connectivity permits it. If the attention level is normal 1022, limited (e.g. green light—1030) information is conveyed 1025 to avoid distracting the driver. If the attention level is marginal 1023, acoustic feedback is added to the lights 1031 to call driver's attention 1026. If attention is insufficient 1029 a pattern of audible and visual alerts 1032 are produced using an alarm driver alert 1027, escalating if the condition persists. Depending on the urgency and severity a dialog interaction 1028 is used to quickly communicate the problem detected and the identified countermeasure offered to the driver.

Pattern acoustic warning may include sequence and patterns of sounds and voices (could be audio, voice, song, chirp). Pattern spoken warning may include a sequence and/or patterns of voices.

It should be noted that the use of terms "low", "marginal" or "insufficient" do not reflect a hard three scenario level of events.

When a crash is detected an audio/video clip 1017 is recorded (up to 10 sec before and after the crash), complete with location, time, sensor information to enable full reconstruction of the situation before and at the crash.

Inattention events-triggered data is recorded in a Driving Data Record, and analyzed over a time series to produce statistics in form of a Driver Risk Profile 1033 available for use by Fleet Managers and/or insurance Carriers. The same analytics are used to provide driving performance reports and trends to the driver, upon request by the driver or occasionally at safe times, to reinforce motivation of the driver to continue to do well. Driving Data Records and Reports are uploaded to the Cloud for additional processing 1034.

Figure 11:
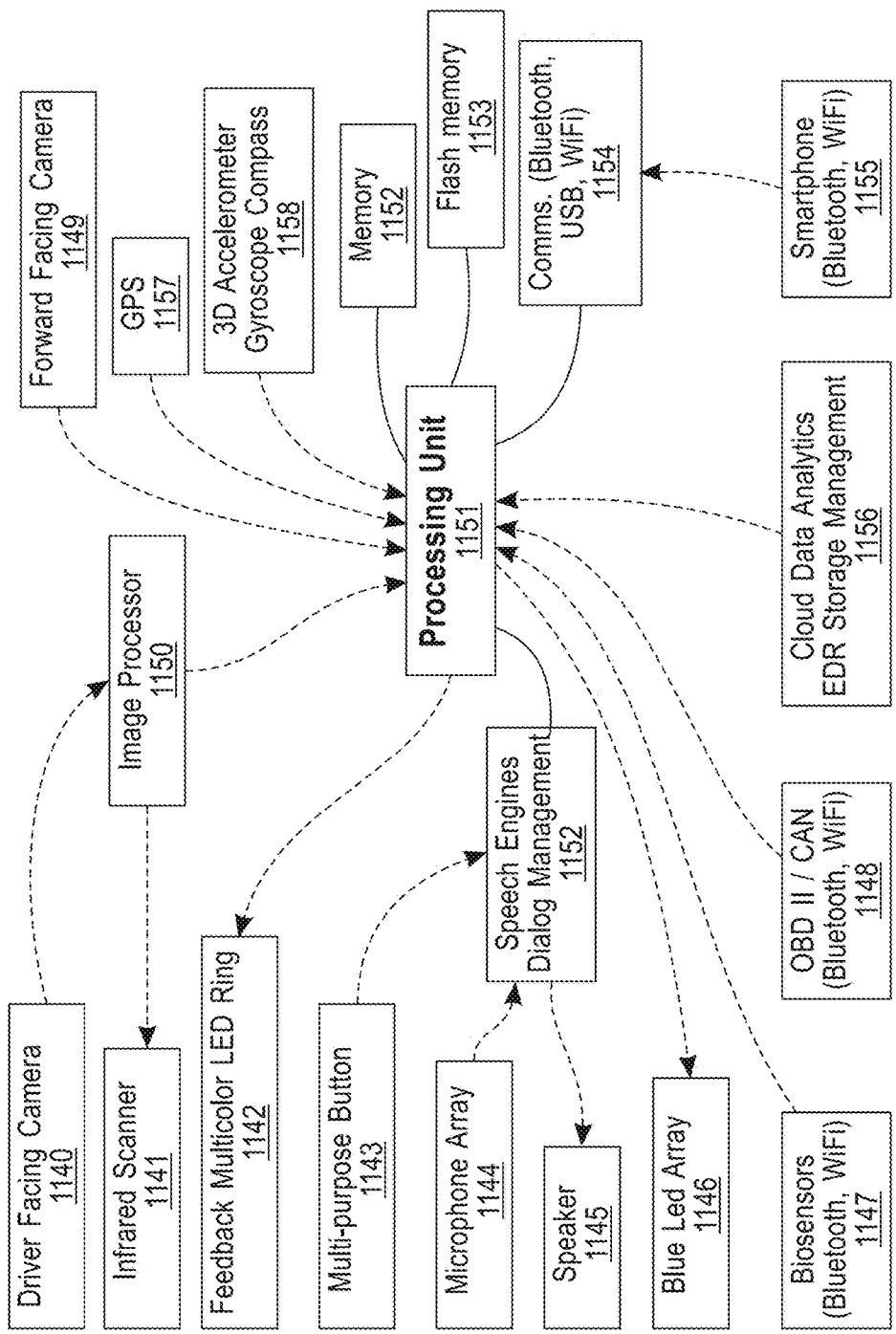
FIG. 11 shows still another exemplary implementation according to an embodiment of the present invention.

FIG. 11 shows another embodiment for the present invention. The components are used:
NearIR and RGB Camera(s) facing driver and back passenger seat;
Solid State InfraRed LED Scanner (for depth sensing and eye gaze tracking);
Multicolor LED Ring Light for visual feedback to driver;
Multi-purpose Button (change interaction mode, help, emergency);
Beamforming Microphone Array for driver vocal input, speech id verification, ambient sound analysis;
Speaker for acoustic/voice feedback to driver;

470 nm Blue LED array (for retina stimulation→alertness restoration);
Biosensors (HRV, GSR, Blood Pressure, Breathing);
OBD II and CAN Connection;
Forward facing camera for road scene analysis;
Image Processor for head pose/eye gaze tracking/eye lid analysis/face id verification;
Main CPU of system;
CPU's memory;
CPU's long-term storage (Flash);
Communication Channels (USB 3.1, Bluetooth LE, WiFi);
iOS or Android Smartphone;
Cloud connection for Data Analytics and Driver Data Storage and Management;
GPS (Galileo, GLONASS); and
3D Accelerometer, Gyroscope, Compass.

Still referring to FIG. 11, the image processor 1150 analyzes video content coming from the driver-facing camera 1140 with the optional aid of an Infrared LED Scanner 1141 to get depth information for more accurate face rotation detection and in dim or no light conditions. Speech Engines (reco, synthesis) and Dialog Management 1152 analyze voice and sound picked up by microphones 1144 and generate audio and verbal prompts via speakers 1145. A multipurpose button is also connected to Speech Engines (reco, synthesis) and Dialog Management 1152. The main Processing Unit 1151 is in charge of:
Processing features created by the Image Processor 1150 (e.g. head rotation, eyelid closing, mouth opening);
Processing video from the road facing camera 1149 to identify and classify objects ahead of the vehicle;
Collecting GPS 1157 information to time- and geo-stamp all events, calculate speed;
Collecting and processing 3D Accelerometer, 3D Gyroscope and Compass information 1158 to determine vehicle motion and forces involved;
Interacting with the Speech Engines 1152 to control communication with the driver;
Controlling activation of a 470 nm Blue LED 1146 to assist attention stimulation of a drowsy driver;
Collecting information from Biosensors 1147 to estimate fatigue and stress of the driver;
Communicating with optional OBD II connected device 1148 to collect additional vehicle information;
Processing Electronic Data Record information and synchronize with the Cloud 1156 when connectivity permits; and
Connect with available smartphone and wireless speakerphones to collect route, traffic, weather info and to interact with driver; p System memory 1152 is used by the processing unit 1151 and solid state storage 1153 holds processed information. In addition to accelerometer/gyroscope/compass information 1158 being available in the main unit, the system can process similar information using a mobile app installed on the phone 1155. The phone 1155 returns information about relative motion of the phone 1155 in the vehicle, to determine potential distraction conditions if the phone is held by the driver.

Figure 12:
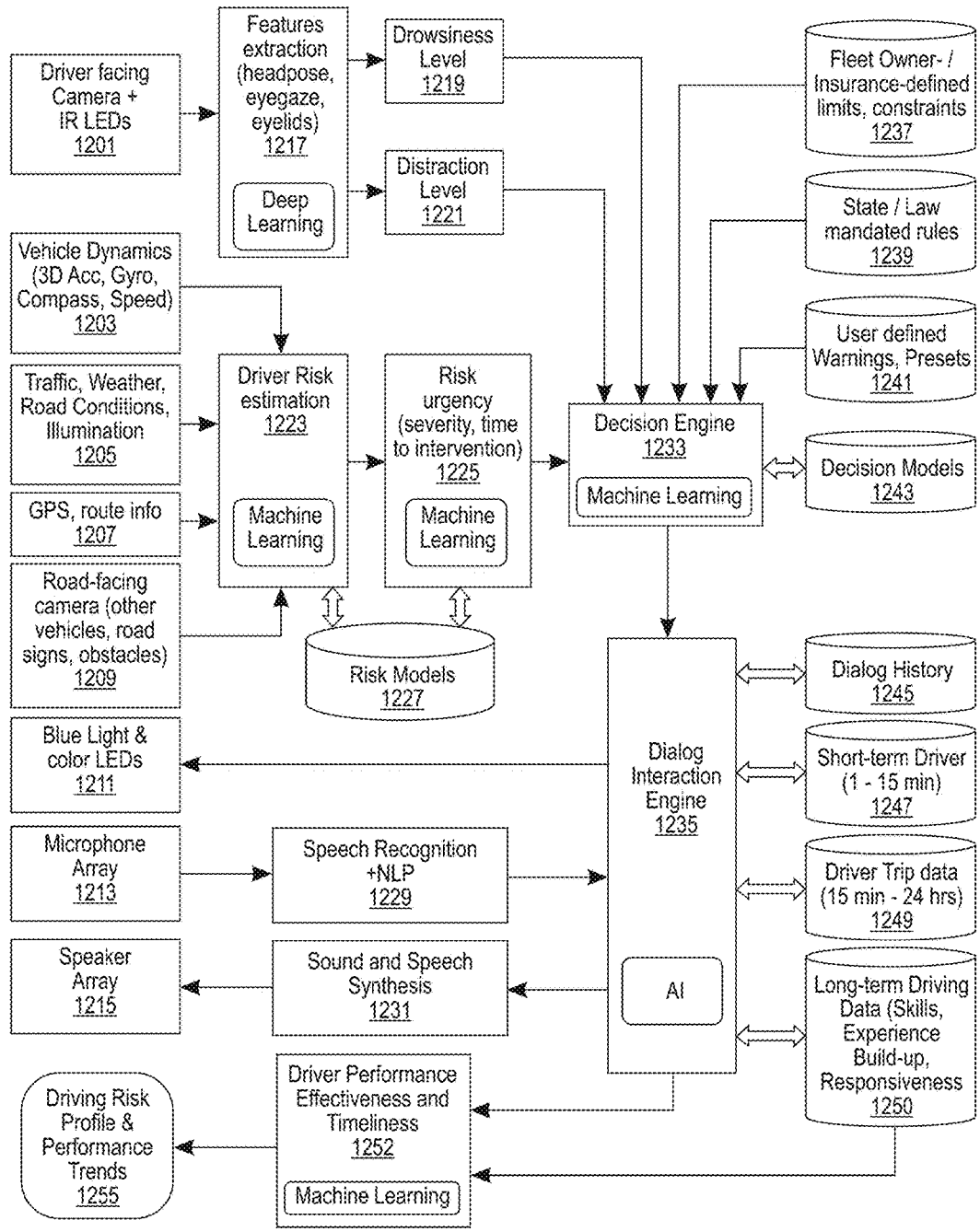
FIG. 12 shows still another exemplary implementation according to an embodiment of the present invention

Referring to FIG. 12, shown is architecture according an embodiment of the present invention. A driver facing camera 1201 generates a video stream for a feature-analysis unit 1217 that uses deep learning to extract headpose, eye gaze, eyelid closing information. The features are analyzed by a drowsiness analysis unit 1219 and a distraction analysis unit 1221 that determine the respective severity levels. A driving risk estimation engine 1223 elaborates information from vehicle dynamics 1203, traffic/weather/road conditions 1205, GPS/route info 1207, road facing camera 1209 to characterize risk and to escalate the urgency 1225 if the driver fails to take action. Machine learning and precomputed risk models 1227 are used to calibrate the risk estimation process to the skills and experience of the driver. The main decision engine 1233 collects information about distraction 1221 and drowsiness 1219 levels, risk level 1225, leveraging mandated behavior guidelines 1237, 1239, taking into account user preferences 1241 and relying on decision models 1243 and Machine Learning to determine what messages to convey to the user. A dialog interaction engine 1235 triggered by the decision engine 1233 generates prompts to the driver using sound and speech synthesis 1231 to drive a speaker array 1215. Microphones 1213 capture driver's reaction, comments, requests to create actionable text via speech recognition and NLP 1229 used by the dialog interaction engine 1235 evaluate responsiveness of the driver. When dialog is used to assess or restore attention of a drowsy driver, the dialog interaction engine 1235 relies on dialog history 1245, short-term driver information 1247, trip data 1249 and information about driver's skills 1250 to decide about type of content, pace, length of the interaction to drive the dialog with the driver. Long-term driving data 1250 and statistics about dialog interactions 1235 are used to evaluate driver performance effectiveness (ability to take right corrective actions, timely), responsiveness of the driver to system generated guidance 1252, and to compile driving risk profiles and driver performance trends 1255. The dialog interaction engine may use the blue LED light 1211 to generate brief timed blinking patterns as part of a mechanism to evaluate driver's alertness (e.g. mimicking light patterns with corresponding blinking of eyelids).

The services the present invention performs are:
Distraction Detection
    Conditions analyzed include:
    Glancing at Center-stack Display
    Touching Center-stack Display
    Glancing at Mobile Phone on cradle
    Touching Mobile Phone screen on cradle
    Reading Text on Mobile Phone (hand-held)
    Touching Screen on Mobile Phone (hand-held)
    Text-typing on Mobile Phone (hand-held)
    Eating or Drinking
    Smoking
    Talking over Mobile Phone (speakerphone/earset)
    Interactions with other passengers
    Singing
    Combing hair/Shaving
    Putting on make-up
Drowsiness Detection
    Detection of Stage 1-2-3 of drowsiness using PERCLOSE
    HRV, Blood Pressure, Breathing Pattern and GSR—when Biosensors are available
Driver Identification
    Visual face analysis
    Face ID verification
    Voice ID verification
    Driving style behavior as "fingerprint"
Passengers Presence and Behavior Detection
    Visual count of passengers
    Analysis of passengers' interactions with driver
Theft detection and recording
    Engine-off vibration analysis
    Low-freq. video sampling and driver detection Forward Scene analysis
   Forward Distance/Collision Detection
   Lane Departure Detection
   Vehicles Recognition and Distance/Delta Speed Measurement
Driver Risk Profiling
   Late Braking, Hard Braking, Hard Acceleration
   Smooth Cornering
   Smooth Acceleration, Gradual Braking
   Lane-keeping Accuracy, Swerving
   Eyes-on-road vs. mirrors vs. elsewhere ratio
Context Risk Evaluation
   Acceleration/Deceleration/Cornering
   Speed (relative to posted limit)
   Travel-time Distance from vehicle(s) in front
   Traffic and accidents ahead
   Time/Distance to exit ramp
   Weather and temperature conditions
   Road pavement conditions The invention uses machine learning to create models used to interpret the multiplicity of data collected in the car and for making real time decisions. Initially thresholds for acceleration (longitudinal, lateral→acceleration/braking, cornering), speed, distance (in sec) from vehicles ahead, distance from lane markings, times for eyes taking away from watching the road to check rearview mirror, instrument cluster, center dashboard, . . . based on speed, skill level, etc. are set using simple rules and common sense values. Data recording in driving simulators will be used to fine tune the initial models and convolutional neural networks will be used to extract visual features of drivers' behaviors.

As testing of the system and data collection will be performed on the road, statistical models describing driver behavior correlated with multiple sensors (motion, visual, audio, biosensors) will be improved via a machine learning process. Data will be initially annotated by experts, including information gathered from the drivers that were monitored. Over time the process will become progressively less supervised, as the system shows signs of robust learning.

Eventually a subset of key features extracted from driving data will feed self-learning algorithms to guarantee continuous improvements of the system over time.

Description of EDR

The driver of the car owns data accumulated in the process of driving the car, including their EDR record. Driver has the ability to suspend/revoke select access rights at any time, including while driving. Driver can reinstate access rights dynamically while driving or at the end of a trip, before information is synchronized with the network (if not connected live).

Sharing of individual parameters can be used to negotiate service terms (e.g. discounts on car insurance premiums), which result into possible individual financial discounts or penalties. Shared parameters can be clustered to match requirements by individual car insurance companies.

Car insurers are offered to bid among themselves to provide competitive insurance services based on the parameters in the EDR, only those that the driver is willing to share.

EDR can be implemented in the following 8 steps:
EDRs are managed by a mobile application on a smartphone owned by the driver and stored on 1) the smartphone itself, 2) on a dedicated device, mounted on the dashboard or windshield or 3) in a dashboard-mounted unit (e.g. infotainment system, CarPlay or Android Auto);

Driver is alerted in real time when preset thresholds are passed during driving, in order to be able to correct driving style and behavior when needed;

Driver has the ability to determine EDR read access rights by other mobile apps, by other parties like the manufacturer of the car or involved Tier-1 suppliers, by service providers (e.g. UBI car insurers);

Selection of the access rights by individual parties for specific sets of parameters is performed via a configuration process on a PC/Laptop, via Web or on the mobile device containing the EDR database;

Secure (encrypted) synchronization allows the smartphone to transfer EDR content (live or historic) to the cloud for further processing and storage backup;

We decouple some information e.g. time and GPS location, and only associate it to significant events like exceeded speed, hard braking etc.;

The idea is that instead of distributing time and place location all the time, which gives the insurance no necessary information from a risk evaluation point of view, but exposes the driver to the risk of being monitored for unapproved reasons, the driver only exposes those pieces of information which are relevant, e.g. where/when did the driver speed, hard brake. Because people don't speed and hard brake all the time the collected information is very limited, potentially zero if there are no driving offenses.

The more the driver complies with the rules, the less private information is exposed to the car insurance, which provides a real incentive for good driving behavior.

The invention and its many embodiments includes:
Method to automatically monitor and analyze driver distraction to generate context-aware safety reminders.
   Means of visual stimulation (via HUD) to evaluate driver's attention and responsiveness.
   Means to make decisions from a plurality of inputs including user connection state, user location, user locale, associations learned through prior observation, wherein not directly specified by the user, external factors as included in transportation factors, weather, destination status.
   Means of visual analysis of scene ahead used to verify driver's attention (Exit sign question).
   Means to learn user's behavior automatically.
   Means to automatically poll user for feedback.
   A program that user can elect to add to their app portfolio.
   Means to configure the device via response to the setup dialog.
   Means to perform modifications, including adding, removing, changing.
Method to deliver the above product:
   Means to describe action, reminder, recommendation.
   Means to have a dialog between user and system and incorporate.
   feedback into context of reminders.
   Means to override reminders.
   Means to learn the pattern of overriding reminders.
Method of analyzing said patterns for user's review and modification:
   Means to invoke analysis of reminders.
   Means to discover redundant reminders which can be discarded.
   Means to identify reminders which conflict with situational context.
   Means to identify reminder gaps.
Method of analyzing inside video for accident reconstruction and outside video live feed/context for Damage Assessment:

Means of using clamp on box containing camera/lights/LEDs/mike plus detached camera facing forward.

Means of using Modified rearview mirror with translucent glass.

Means of using correlation among multiple cameras.

Method to monitor and analyze the level of driver drowsiness.

Means of using blue light to slow down melatonin production to counteract drowsiness while driving.

Means of using colored lights and acoustic feedback on attention level and attention triggering events (red-yellow-green). Constant/intermittent pattern. Intensity adjusted to internal illumination level.

Method to monitor in cabin behavior of driver and passenger in order to flag dangerous behaviors:

Means to recognize dangerous actions and take action e.g. send alerts.

Means to identify dangerous objects e.g. weapon and take action e.g. send alerts.

Method of detecting potentially dangerous health conditions:

Means to apply bracelet wireless recording of HRV and GSR.

Means of wireless (non-touch) measurement of HRV and breathing.

Means of collecting bio/vital signs to work with onboard personal diagnostics to detect situations that require attention by their physician or specialist.

Means to provide automated "virtual personal nurse" assistance to driver with chronic condition (recommended actions and monitoring against known risk conditions.

Method of audio visual speech recognition to enhance robustness in noisy conditions.

Method of improving driver risk evaluation based on changes in motion energy while braking, rather than simply decelerating (same deceleration at high speed much more risky than at low speed).

Method of virtual coaching (e.g. keep proper distance, avoid late slow down, stay in right lane, stay center in lane, optimize turn trajectories) based on models trained by professional drivers, large number of other drivers in the same area. Method of analysis of cloud of eye gaze tracking points to predict level of driver alertness (distinguish between fixations caused by high interest vs. caused by drowsiness/lack of attention).

Method of using Vehicle-to-Vehicle (V2V)-like information exchange social networks such as Waze, to inform nearby drivers about fitness/distraction/drowsiness/ . . . of a particular driver, to increase safety margins (distance between vehicles, higher attention to unexpected maneuvers, . . . ).

Method for extending Driver Attention Monitoring to use in trucks, motorcycle helmets, trains (for conductors), planes (pilots).

Method for extending Driver Attention evaluation for use at home, at the office, at schools (education).

Method of using audio-visual recognition to automatically spot questionable activities inside cabin (e.g. screaming voice associated to body movements across seats)

The invention and its many embodiments further includes:

Method for Usage Based Insurance Security and Privacy:

Method of Collecting and Storing Driver Data to automatically monitor driving context. Monitoring of context includes detection of driver's behavior and attention as well as car parameters, internal and external.

Program that monitors driver behavior.

Apparatus (hardware and software) to measure driver attention.

Means to provide real time feedback to the driver.

Means to learn user's behavior automatically

Means to automatically poll user to evaluate responsiveness/alertness in presence of symptoms of drowsiness.

Method of Data Access Policy Management to automatically set driver's preferences and deliver feedback.

Provide the mechanism for definition of data access rights with degrees of flexibility.

Have dynamic character of data access rights. Ability to suspend/revoke select access rights at any time, including while driving. Driver can reinstate access rights dynamically while driving or at the end of a trip.

Address various aspects of EDR data, its varied nature (data inside and outside of the car, driver's behavior).

Let the driver identify who gets to see what EDR data, when and how.

Use sensors to collect and process most valuable driver behavior data.

Create driver behavior and attention models.

Process EDRs dynamically and grant access rights to EDR data on the fly.

Method to deliver the product of the above embodiments:

Means to invoke collection and storage of driver data.

Means to analyze driver data on the fly.

Mechanism to enable bids by insurance companies for the driver's business, based on privacy settings defined by the driver.

Insurers competing for the driver's business.

Drivers able to select best fitting insurer or combine insurers on the fly given a specified set of private data that the driver is willing to make available.

Policy premium pricing by the hour of coverage and based on driving behavior (e.g. for car rentals).

Dynamic control logic that determines multiple data access patterns for the same users depending on the context.

Means for the insurer to override information protection locks set by the driver when the situation requires it (e.g. system detects a serious accident, it verifies whether the driver is conscious and able to authorize disclosure of location etc. for use by ambulance, police to come to rescue). If driver is unconscious (no dialog, video analysis of the cabin) insurance can override lock mechanism for the benefit of saving driver's life.

Means for the driver to quickly/temporarily change privacy settings in urgent situations.

The invention and its many embodiments still further includes:

Method to provide Qi wireless charging to devices attached to car windshield: transmitter coil embedded in windshield at array of location at the top or bottom of the windshield, to enable multiple devices or multiple positions to be used. Receiver coil is installed in docking support with sucking cup, and connected to the device (e.g. smartphone).

Method to anonymize video recordings in car while preserving attention/distraction/drowsiness extracted features. Face of driver is analyzed for head pose pitch/yaw/roll, eye gaze tracking left/right/up/down, independent eyelids closing frequency/duration/pattern, mouth shape/opening/closing, lips shape/opening/closing. Then all the collected features are used to control rendering of a synthesized face, in sync (or short delay) with the original face expressions and movements of the driver. Then the synthesized face is put in place of the driver's face in the video recording, resulting in a hybrid video containing real visual context and synthesized face, to enable examining of driver behavior in dynamic context, without revealing identity of the driver.

Method for evaluation of user attentiveness when listening to or watching an advertisement message. Visual and audio analysis of the user's reaction to the message can be used to rate pleasure/satisfaction/interest or lack thereof and confirm that the message has been received and understood, or not. This is particularly useful in a contained environment like a car cabin (especially in a self-driving or autonomous vehicle) but can be extended for use at home or work, where one or more digital assistants have the ability to observe a user's response to ad messages. With some constraints, it can be used also on mobile phones, using the front-facing camera after verifying that the user looking at the screen/camera is the target of the evaluation.

Method for evaluation of user responsiveness to guidance/coaching, to determine if communication strategy is effective. Short-term (few dialog turns) evaluation shows ability of the user to correct attention deficit and regain (mind) control. Long-term (days-weeks) evaluation can be used to determine user coachability and behavior improvement. Increasing user skills should lead to progressively more streamlined and infrequent dialog prompts by the system. System would be designed for use in the car, but can be extended for use on mobile devices, home, work, etc.

Method for automated notification of changes in driving rules (e.g. speed limits, no turn on red signal, limited or no usage of cellphones or partial functions, . . . ) when crossing State boundaries. Communication is verbal only, succinct but requests for clarification from user can be handled by providing more exhaustive explanations, as needed. Change in local traffic regulations can be shared with driver monitoring system to encourage driving behavior consistent with the rules.

Method for spatially located audio feedback using multiple speakers installed in a vehicle, and phase modulation across the available channels. Sound or voice of the system alerting the driver can be projected to come from the direction where the driver is requested to pay attention to (e.g. "Watch the car that stopped before you" or "Pay attention to the cyclist on your right)". Connection between the warning system and the audio subsystem is performed using wireless (e.g. WiFi or Bluetooth) or wired (e.g. USB) links, and using surround-sound (e.g. Dolby®) modulation of the audio information. The goal is to quickly inform the driver where the danger is, without having to describe where it is as part of the message, to convey urgency effectively and timely. By extension, the same techniques can be used in a multi-speaker environment like home, using dedicated speakers of a surround-sound home theater system or a cluster of digital assistants (e.g. Google® Assistant, Amazon Alexa®) to project the source of the warning message.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, JavaScript, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    a computer device receiving extracted features from a driver-facing camera and from a road as viewed by a road-facing camera;
    the computer device further receiving extracted features reflecting the driver's behavior including head and eyes movement, speech and gestures;
    the computer device further receiving extracted telemetry features from a vehicle;
    the computer device still further receiving extracted features reflecting the driver's biometrics; and
    a decision engine receiving information from the computer device representing each of the extracted features of the driver, wherein a projected risk level is determined using the extracted features from the road-facing camera using a risk estimation process calibrated to skills and experience of the driver using machine learning, and a driver's attention and emotional state is determined to evaluate risks associated to moving vehicles and the driver's ability to deal with the projected risk.

2. The method according to claim 1, wherein if the decision engine dynamically determines that the driver's attention is inadequate given the projected risk level then the decision engine issues an informational alert to the driver.

3. The method according to claim 2, wherein the informational alert is a colored light and haptic signal.

4. The method according to claim 1, wherein the decision engine dynamically determines which set of personalized models to use for the driver identified by biometrics.

5. The method according to claim 1, wherein if the decision engine dynamically determines that the driver's attention is insufficient then the decision engine issues a colored light informational alert, a pattern acoustic warning, and a pattern spoken warning to the driver.

6. The method according to claim 1, wherein if the decision engine dynamically determines that the driver's attention is insufficient then the decision engine starts an interaction dialog with the driver to restore the driver's attention.

7. The method according to claim 1, wherein the decision engine further uses driving condition information and compares the driving condition information obtained by the extracted features of the road with the determined driver's attention level before the decision engine issues any warnings.

8. A driver assistant system comprising:
    one or more processors, one or more computer-readable memories and one or more computer-readable, tangible storage devices;
    a driver's attention state module operatively coupled to at least one of the one or more storage devices for execution by at least one of the one or more processors via at least one of the one or more memories, configured to receive extracted features for a driver from a camera facing the driver and from a road as viewed by a camera facing the road;
    the driver's attention module operatively coupled to at least one of the one or more storage devices for execution by at least one of the one or more processors via at least one of the one or more memories, is further configured to receive extracted features reflecting the driver's facial and hand gestures, and speech;

the driver's attention module operatively coupled to at least one of the one or more storage devices for execution by at least one of the one or more processors via at least one of the one or more memories, is further configured to receive extracted features reflecting the driver's biometrics; and a decision engine module operatively coupled to at least one of the one or more storage devices for execution by at least one of the one or more processors via at least one of the one or more memories, configured to receive information from the driver's attention module representing each of the extracted features of the driver, wherein a driver's attention, wellness and emotional state is determined, and determine a projected risk level using the extracted features from the road-facing camera using a risk estimation process calibrated to skills and experience of the driver using machine learning.

9. The driver assistant system according to claim 8, wherein if the decision engine module dynamically determines that the driver's attention is inadequate for the projected risk level then the decision engine module issues an informational alert to the driver, whereby escalation is applied to the alerts depending on level of severity and urgency.

10. The driver assistant system according to claim 8, wherein if the decision engine module dynamically determines that the driver's attention is insufficient then the decision engine issues a colored light informational alert, a pattern acoustic warning, and a pattern spoken warning to the driver.

11. The driver assistant system according to claim 8, wherein if the decision engine module dynamically determines that the driver's attention is insufficient then the decision engine starts an interaction dialog with the driver to restore the driver's attention.

12. The driver assistant system according to claim 8, further comprises:

a driver reaction evaluation system which evaluates a driver's reaction to the alerts and quality of the resulting intervention to create a driving profile that describes driver's demonstrated skills, ability to react and contains historic data about responsiveness and performance trends over time.

13. The driver assistant system according to claim 12, wherein observed responsiveness of the driver to alerts is used to modify the alerts to improve effectiveness of the interaction and minimize time to action by the driver.

14. The driver assistant system according to claim 8, wherein the decision engine module further uses driving condition information and compares the driving condition information obtained by the extracted features of the road with the determined driver's attention level before the decision engine issues any warnings.

15. A virtual co-pilot method comprising:

an image processor receiving images from a camera facing a driver;

the image processor receiving scans from an infrared scanner facing the driver;

a road facing camera a speech engine receiving speech from the driver using a microphone; and biosensors providing biometric data from the driver to a processing unit, wherein the processing unit uses machine learning to dynamically evaluate risks associated by the received images and scans from the image processor wherein a projected risk level is determined using extracted features from the road-facing camera using a risk estimation process calibrated to skills and experience of the driver using machine learning, and, the received speech from the speech engine and the provided biometric data from the biosensors to determine a driver's attention, emotional state and fatigue.

16. The virtual co-pilot method according to claim 15 further comprising allowing the driver to modify Electronic Driving Record (EDR) data access rights dynamically and identify who gets to see what EDR data to provide privacy protection and enable dynamic policy negotiation with an insurance company.

17. The virtual co-pilot method according to claim 15, wherein if the processing unit dynamically determines that the driver's attention is marginal then the processing unit issues a colored light informational alert and a pattern acoustic warning to the driver.

18. The virtual co-pilot method according to claim 15, wherein if the processing unit dynamically determines that the driver's attention is insufficient then the processing unit issues a colored light informational alert, and a pattern acoustic warning and a pattern spoken warning to the driver via a speaker.

19. The virtual co-pilot method according to claim 15, wherein if the processing unit dynamically determines that the driver's attention is insufficient then the processing unit starts an interaction dialog with the driver using dialog management within the speech engine to restore the driver's attention.

20. The virtual co-pilot method according to claim 15, wherein the processing unit further uses driving condition information and compares the driving condition information obtained by the extracted features of the road with the determined driver's attention level before the processing unit issues any warnings.

* * * * *